(12) United States Patent
Wheeler et al.

(10) Patent No.: US 8,290,212 B2
(45) Date of Patent: Oct. 16, 2012

(54) SUPER-RESOLVING MOVING VEHICLES IN AN UNREGISTERED SET OF VIDEO FRAMES

(75) Inventors: Frederick Wilson Wheeler, Niskayuna, NY (US); Anthony James Hoogs, Niskayuna, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 1125 days.

(21) Appl. No.: 12/219,225

(22) Filed: Jul. 17, 2008

(65) Prior Publication Data

US 2010/0014709 A1  Jan. 21, 2010

Related U.S. Application Data

(60) Provisional application No. 60/929,890, filed on Jul. 17, 2007.

(51) Int. Cl.
*G06K 9/00* (2006.01)

(52) U.S. Cl. .......................................... 382/104; 348/148

(58) Field of Classification Search ........................ None
See application file for complete search history.

(56) References Cited

U.S. PATENT DOCUMENTS

| | | | |
|---|---|---|---|
| 7,609,900 B2 * | 10/2009 | Ishii et al. | 382/233 |
| 2004/0156561 A1 * | 8/2004 | Yu-Chuan et al. | 382/298 |
| 2007/0019887 A1 * | 1/2007 | Nestares et al. | 382/299 |
| 2007/0071362 A1 * | 3/2007 | Milanfar et al. | 382/299 |
| 2010/0014709 A1 * | 1/2010 | Wheeler et al. | 382/103 |
| 2010/0053333 A1 * | 3/2010 | Schutte et al. | 348/169 |
| 2010/0272184 A1 * | 10/2010 | Fishbain et al. | 375/240.16 |

OTHER PUBLICATIONS van Eekeren, A.; Schutte, K.; Dijk, J.; de Lange, D.J.J.; van Vliet, L.J.; , "Super-Resolution on Moving Objects and Background," Image Processing, 2006 IEEE International Conference on , vol., no., pp. 2709-2712, Oct. 8-11, 2006 doi: 10.1109/ICIP.2006.313074, URL: http://ieeexplore.ieee.org/stamp/stamp.jsp?tp= &arnumber=4107128&isnumber=4106440.*

* cited by examiner

*Primary Examiner* — Brian P Werner
*Assistant Examiner* — Tahmina Ansari
(74) *Attorney, Agent, or Firm* — Birch, Stewart, Kolasch & Birch, LLP

(57) ABSTRACT

A method is provided for accurately determining the registration for a moving vehicle over a number of frames so that the vehicle can be super-resolved. Instead of causing artifacts in a super-resolved image, the moving vehicle can be specifically registered and super-resolved individually. This method is very accurate, as it uses a mathematical model that captures motion with a minimal number of parameters and uses all available image information to solve for those parameters. Methods are provided that implement the vehicle registration algorithm and super-resolve moving vehicles using the resulting vehicle registration. One advantage of this system is that better images of moving vehicles can be created without requiring costly new aerial surveillance equipment.

13 Claims, 12 Drawing Sheets

SUPER-RESOLVING MOVING VEHICLES IN AN UNREGISTERED SET OF VIDEO FRAMES

PRIORITY

This Application claims priority from Provisional Application 60/929,890, filed on Jul. 17, 2007.

FIELD OF THE INVENTION

The present invention generally relates to imaging and, in particular, relates to super-resolving moving vehicles in an unregistered set of video frames.

DESCRIPTION OF RELATED ART

It is desirable to provide ever-increasing resolution from surveillance imaging platforms. One approach to increasing resolution involves utilizing improved optics, but this can be cost-prohibitive. Another approach toward improving the resolution of surveillance images involves super-resolving images. Super-resolution (SR) is a technique that enhances the resolution of an imaging system. There are both single-frame and multiple-frame variants of SR. The present invention is concerned with multiple-frame SR.

The aim of SR is to estimate a high resolution image from several low resolution images of the same scene. SR gains result from a combination of noise reduction, de-aliasing and deblurring, or high-spatial frequency restoration. SR has a long history, primarily of applications to whole images of static scenes.

Multiple image frame SR algorithms are designed to combine several images of a scene to produce one higher resolution image. Before a set of images or frames can be super-resolved, they must be registered. In general, image super-resolution algorithms model the image registration as translations or homographies. In aerial surveillance applications, such a registration model generally works well for a static ground scene. However, when objects are moving in the scene, they are not properly registered by this model and the effect on the super-resolved image is distortion in the local area of the moving object.

Other SR methods that might address moving objects are based on optical flow, a very general image registration technique. In the case of small moving vehicles, optical flow will not give reliable or accurate registration.

Regardless of the particular SR method used, the challenge of vehicle super-resolution from surveillance images stems from the fact that the vehicles may be very small in relation to the overall image, so frame-to-frame registration of a moving vehicle does not offer enough constraints to provide registration information with sub-pixel accuracy. If the vehicle cannot be accurately registered across image frames, effective resolution enhancement across image frames is not possible.

SUMMARY OF THE INVENTION

In accordance with one embodiment of the present invention, a method is provided for accurately determining the registration for a moving vehicle over a number of frames so that the vehicle can be super-resolved. Instead of causing artifacts in a super-resolved image, the moving vehicle can be specifically registered and super-resolved individually. An embodiment of this method uses a mathematical model that captures motion with a minimal number of parameters and uses the available image information to solve for those parameters. Advantages of such a method are that improved images of moving vehicles may be created without requiring the use of costly new aerial surveillance equipment, or may be created using lower-resolution (and therefore lower cost) image capture devices.

According to one aspect of the invention, software is provided that implements the vehicle registration algorithm and super-resolves moving vehicles using the resulting vehicle registration. Such software may be embodied on any appropriate computer-readable medium.

One embodiment of the present invention uses a two-stage registration approach. Accurate registration of a whole image may be accomplished using the images themselves. Such a whole-image registration approach is feasible because a very large number of pixels are used for a small number of registration parameters. Accurate registration of moving vehicles is more challenging because the vehicles are usually very small, typically on the order of 10×20 pixels. Registering a small image region where the vehicle is dominant by using techniques similar to whole image registration is more difficult because the pixel-area comprising the vehicle simply does not contain enough information to accurately register it across image frames. The present invention addresses this difficulty by introducing a second registration stage for the vehicle.

An embodiment of the two-stage approach involves first using the standard, whole-image registration approaches to register the dominant, static background features across pairs of image frames. In such an embodiment, once the static components are registered across pairs of image frames (from a set of N image frames), the vehicle registration portion comprises estimating the vehicle motion of a selected vehicle across all N image frames with a constrained motion model and a frame-to-frame consistency criteria. In this way, significantly more image data is applied toward the estimation of a few registration parameters for the vehicles.

In one embodiment, estimating vehicle motion parameters is done using a cost function with constant velocity motion model. The motion parameters, and therefore the vehicle registration, may be determined with unconstrained, non-linear optimization techniques. Such techniques may include a cost function that has both foreground (vehicle) and background consistency components. Alternative embodiments of the present invention may use variable velocity, variable acceleration, or relative velocity models. Yet further alternatives may only examine sub-sections of the background for consistency or may crop the whole image after the first registration step to reduce the volume of pixels being operated on for subsequent processing steps.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

The following detailed description of the invention refers to the accompanying drawings. The same reference numbers in different drawings identify the same or similar elements. Also, the following detailed description does not limit the invention. Instead, the scope of the invention is defined by the appended claims and equivalents thereof.

Although improved optics are one solution for improving the resolution of a surveillance system, a more cost-effective and more easily implemented solution is super-resolving multiple image frames to enhance the clarity and level of detail in captured images.

One difficulty in effective super-resolution of objects within images is registering those objects with sub-pixel accuracy across image frames. Image registration is the process of translating or warping a set of two or more images taken from different camera positions so that the image objects are aligned, or more specifically, determining the translation or warping function parameters that would align the images. Image registration is also referred to as image stabilization. Registration is necessary in order to be able to compare or integrate the data obtained from different measurements. This process is especially challenging in surveillance videos observing vehicles, where a given vehicle may only be 10×20 pixels in size. While registering a series of still images is well known and relatively easy to do, it is more challenging to register a single image region that moves from image frame to image frame and potentially varies from image to image. One embodiment of the present invention uses a two-stage registration approach to resolve difficulties in registering such small image objects across multiple image frames.

Figure 1:
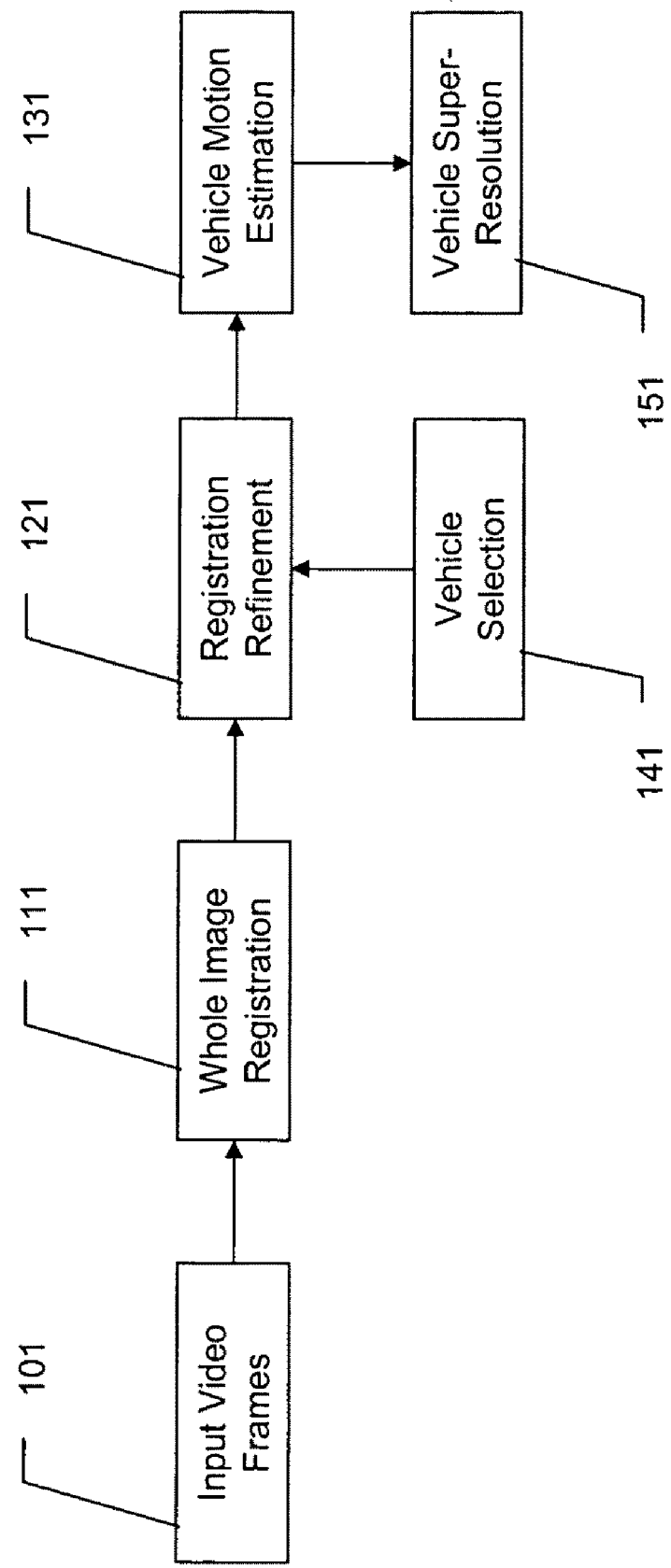
FIG. 1 is a block diagram showing the main processing stages of a moving vehicle super-resolution system according to the present invention.

A block diagram of an embodiment of a registration and super-resolution process according to the present invention is shown in FIG. 1. In the embodiment depicted, the process begins with the input of multiple, continuous video frames 101 gathered from an aerial surveillance system, or similar source. The first stage of registration involves registering each whole video frame across the set of all the video frames 111, and may make use of known whole image registration techniques. These may include area-based or feature-based techniques, and may involve spatial-domain or frequency-domain methods.

One particular whole-image registration technique used in an embodiment of the present invention entails registering the static dominant background portions of the images by working with the images in pairs. That is, each consecutive pair of image frames in the frame sequence is registered based on the static background elements present across the image frames. Registering each consecutive pair of image frames in this manner effectively registers the entire set of image frames. Alternate embodiments of the present invention may employ different whole-image registration techniques, such as simultaneous registration of all images using a batch-mode registration algorithm.

Once the background elements have been registered, a vehicle is selected 141 for registration refinement 121. Whole image registration techniques are not suitable for registering a vehicle in an image frame since the vehicle is generally small, perhaps only 10×20 pixels in size. Registration refinement begins with an estimate of vehicle motion over all the video frames in a selected sequence 131. In one embodiment of the present invention the vehicle motion estimate is accomplished by jointly using a constrained motion model and frame-to-frame consistency criteria. In such an embodiment, a constant-velocity motion model may be appropriate. Alternative embodiments of the present invention may estimate vehicle motion using a motion model that includes turning and acceleration.

Estimation of vehicle motion parameters (not shown), which is included in the vehicle motion estimate, may be performed with unconstrained non-linear optimization in one embodiment of the present invention. This is accomplished by defining a cost function with a foreground, or vehicle, consistency component and a background consistency component and then solving for vehicle motion parameters that optimize the cost function. Once the vehicle motion is estimated, the vehicle may be super-resolved across the image frames 151. Alternative embodiments of the present invention may accomplish estimation of vehicle motion parameters by a range of techniques including Conjugate Gradient or Broyden Fletcher Goldfarb Shannon minimization (BFGS).

Figure 2:
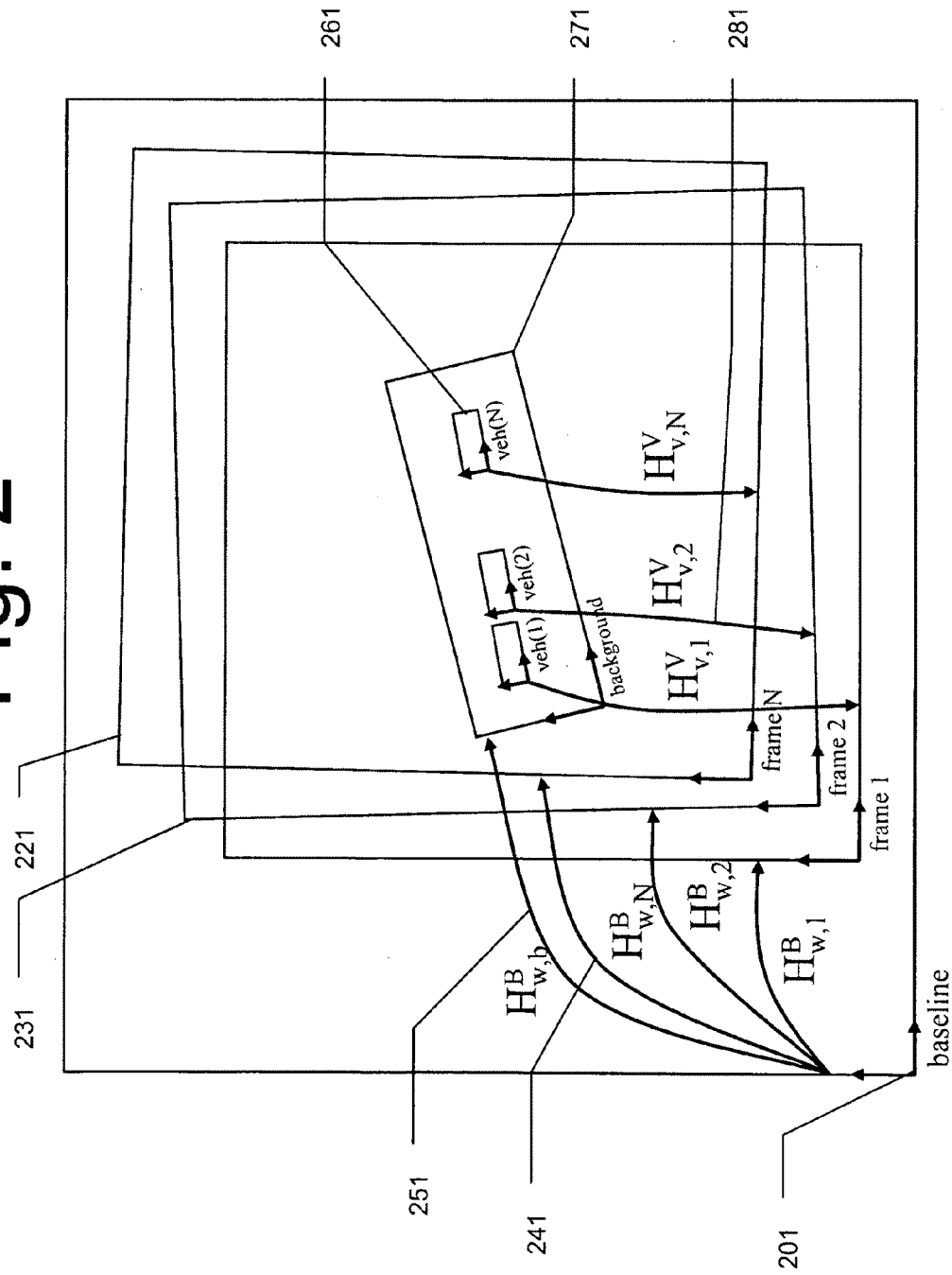
FIG. 2 shows the frames of reference and the homographies used to map points across frames of reference in an embodiment of the present invention.

One embodiment of the present invention accomplishes whole image registration for a sequence of N video frames by registering each consecutive pair of frames with a homography. An embodiment of a whole-image homography registration is depicted in FIG. 2, which employs a feature-based KLT algorithm to estimate the whole-image homographies. In such a feature-based approach, a homography $H^b_{ij}$ maps coordinates of a background feature point in frame i to the same feature point in frame j. The world frame of reference 201, is an arbitrarily selected fixed baseline designated as frame "w." In the embodiment shown in FIG. 2, the inter-frame homographies 221, 231 are converted to homographies of the form $H^b_{wi}$, 241, 251 mapping coordinates from the world frame into frame i. Inter-frame coordinate mapping is then accomplished using the world-relative homography of a first frame, and the inverse of the world-relative homography of a second frame. Alternative embodiments of a whole image registration mapping process may employ the frame of reference of one of the other image frames as the baseline world frame of reference, or may calculate an average frame of reference instead of using an arbitrary baseline. Yet further embodiments of whole image registration techniques may avoid homography mapping and instead employ techniques such as simple horizontal and vertical shifts or affine transforms.

After the whole image registration process, a vehicle must be selected for registration refinement and motion estimation. In one embodiment of the present invention, vehicle selection is initially accomplished by coarse user selection in two different user-selected frames. Once the vehicle is selected, the whole image registration is refined further. Based on the initial vehicle waypoints 331, 321 and image frames 341, 351 selected by the user (see FIG. 3), the approximate location of the selected vehicle can be determined within each frame of the N-frame sequence. Alternative embodiments may use automated or computer-assisted techniques for vehicle selection by applying object recognition or edge-tracing techniques to one or more image frames, there by identifying or making preliminary guesses at potential target vehicles for super-resolution.

In one embodiment of the present invention, an X by X region of pixels (231, 221 for example) is cropped around the approximate vehicle location 261, where X is a comparatively large, arbitrary number that depends on overall image resolution and imaging conditions. For registration purposes, this entire region 261 is regarded as the vehicle. In embodiments X may be set at 200. After cropping each frame, the world-relative homographies are adjusted accordingly, and then the background registrations for the newly-cropped regions are further refined. In one embodiment, this refinement may be accomplished by solving for additional shift-only registration components for frames 2 through N that minimize normalized correlation with frame 1. This refinement process eliminates error accumulation introduced by pairing image frames for whole-sequence registration. Alternative embodiments may refine background registrations for the vehicle regions using more general registration functions such as affine transforms or homographies.

In an embodiment of the present invention employing a vehicle model having a constant ground velocity and relatively fixed shape across image frames, parametrization of the vehicle may be accomplished by the two previously selected waypoints. The fixed-size rectangle 261, used as the vehicle shape, defines a new frame of reference that follows the vehicle as it travels 271. Vehicle-specific homographies 281 are determined that map points from this frame of reference to each video frame. Alternate embodiments of the present invention may employ different vehicle models, such as shapes that adapt to the precise shape of the vehicle and motion models that include turning or acceleration.

Figure 3:
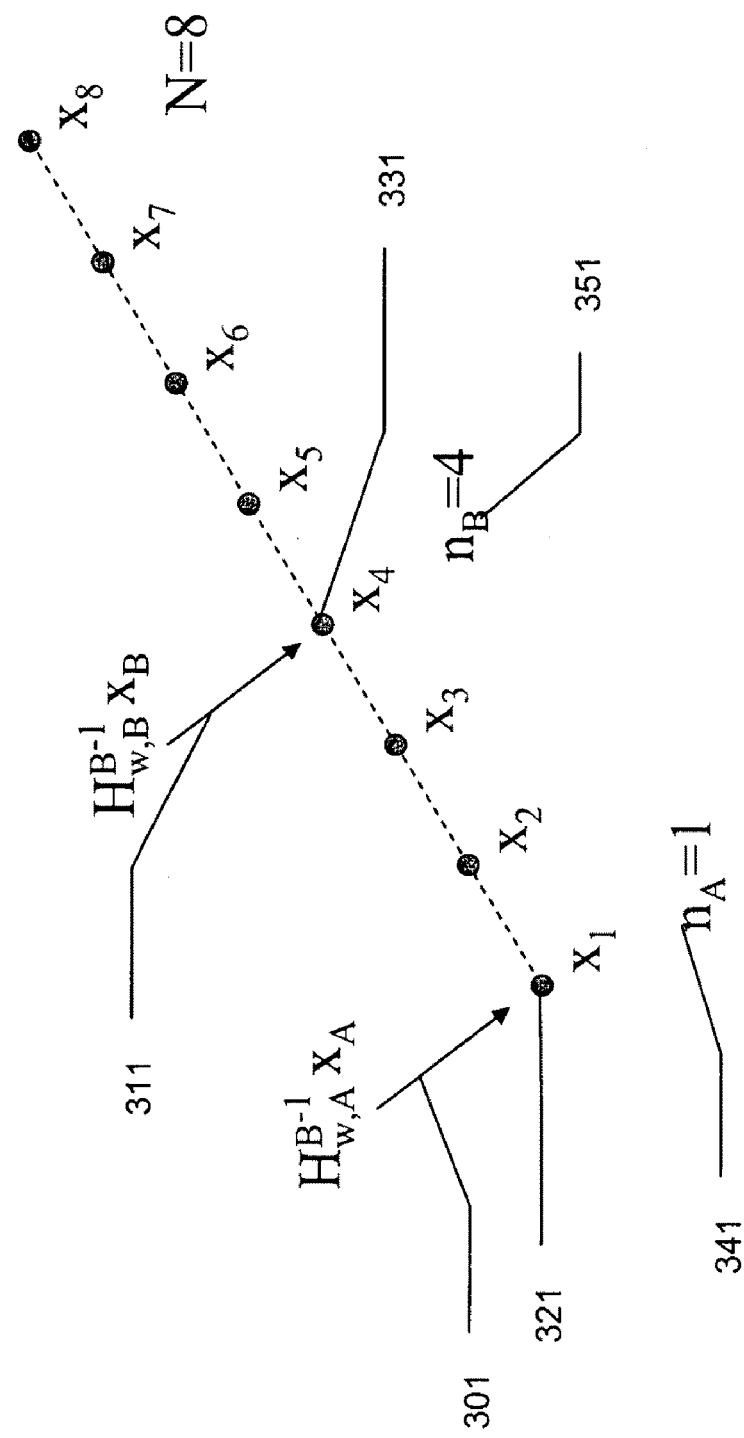
FIG. 3 shows vehicle location and motion parametrization points across image frames in an embodiment of the present invention.

In an embodiment of the present invention with a constant velocity assumption, as depicted in FIG. 3, the location $x_i$ of the vehicle to be determined in any video frame, i, using the formula:

$$x_i = H^b_{w,i}(((n_b-i)/(n_b-n_a))*H^{b^{-1}}_{w,a} x_a + ((i-n_a)/(n_b-n_a)) * H^{b^{-1}}_{w,b} x_b)$$

where $n_a$ 341 and $n_b$ 351 are the indices of the image frames in which waypoints are defined, $x_a$ 321 and $x_b$ 331 are the selected or estimated waypoints, $H^b_{w,i}$ is the world-relative background homography with respect to frame i, $H^{b^{-1}}_{w,a}$ is the inverse of the world-relative background homography with respect to frame a, and $H^{b^{-1}}_{w,b}$ is the inverse of the world-relative background homography with respect to frame b. This formula converts the two vehicle waypoints into the world frame of reference and interpolates or extrapolates the points to a particular image frame, i, and converts the result into i's frame of reference.

Information about the selected waypoints and the extracted/interpolated points of the vehicle locations in the world frame of reference allows for the definition of a vehicle image $I_v$ and a vehicle frame of reference just large enough to hold a rectangle containing the vehicle image 261. For each frame, this rectangle is centered at the location $x_i$ and oriented according to a direction of travel as determined by evaluating the individual point locations over time. This set of data effectively defines a vehicle registration homography $H^V_{v,i}$ 281 that maps points on the vehicle from the vehicle frame of reference to the same vehicle point in frame i.

In one embodiment of the present invention, a fixed size background region is defined based on the vehicle motion parameters 271. This background region may be a rectangle that is aligned with the initial vehicle path and sized so that the entire vehicle path is contained within the region. The purpose of this background region is to reduce computation by limiting subsequent image manipulation and processing to only that portion of the overall image in the immediate vicinity of the vehicle. Alternate embodiments of the present invention may use a fixed size background region aligned to the average whole-image background, or a non-rectangular background that may more closely align to a curved vehicle path. The establishment of this background region allows the rest of the image data to be excluded from further processing. This enables the realization of computational efficiencies and a smaller data footprint for subsequent operations.

Figure 4:
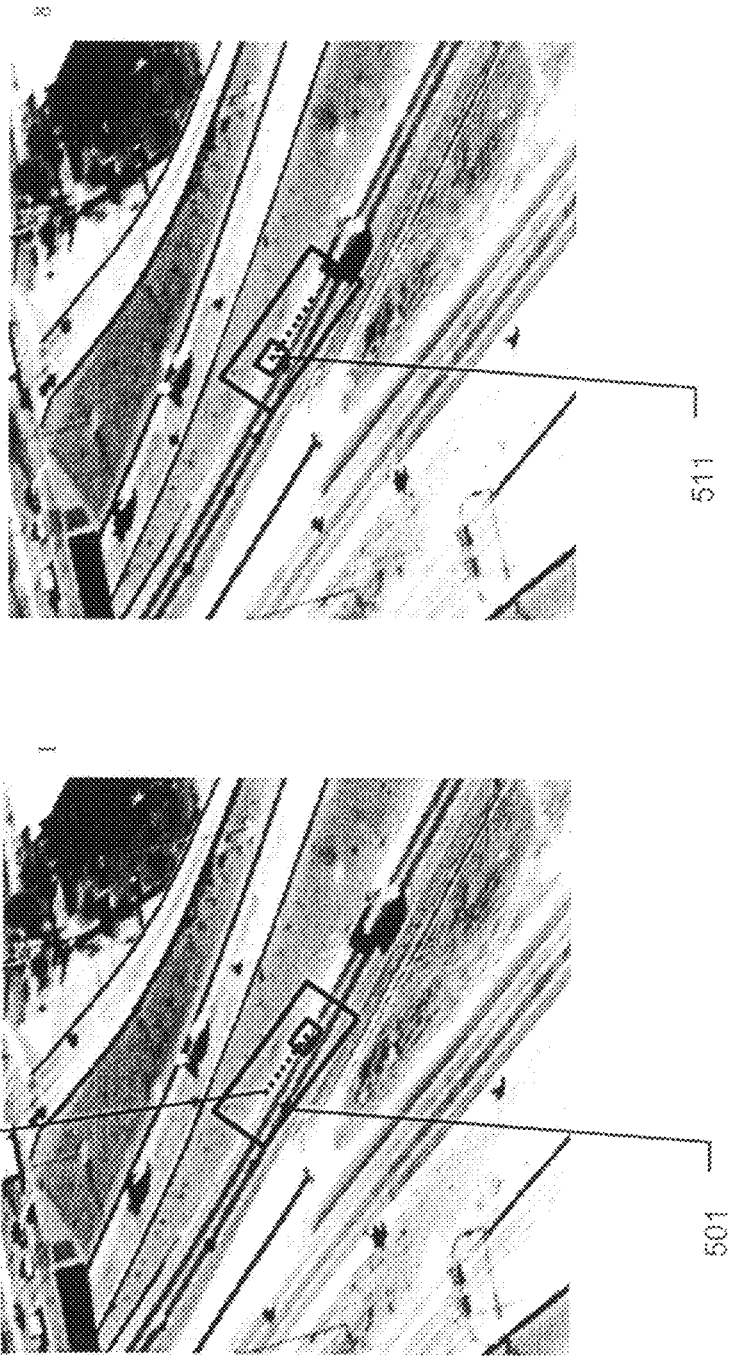
FIG. 4 shows the vehicle frame of reference and registered vehicle positions using non-optimized motion parameters.

FIG. 4 shows two image frames from a series of image frames that have undergone initial vehicle waypoint selection. The fixed size background region 501 fully encompasses all the vehicle waypoints 521 across all the image frames being registered, but the waypoints, and also the vehicle region 511 do not quite match the actual path of the vehicle itself across the image frames. This issue is addressed by optimizing vehicle motion parameters during the registration process.

Figure 6:
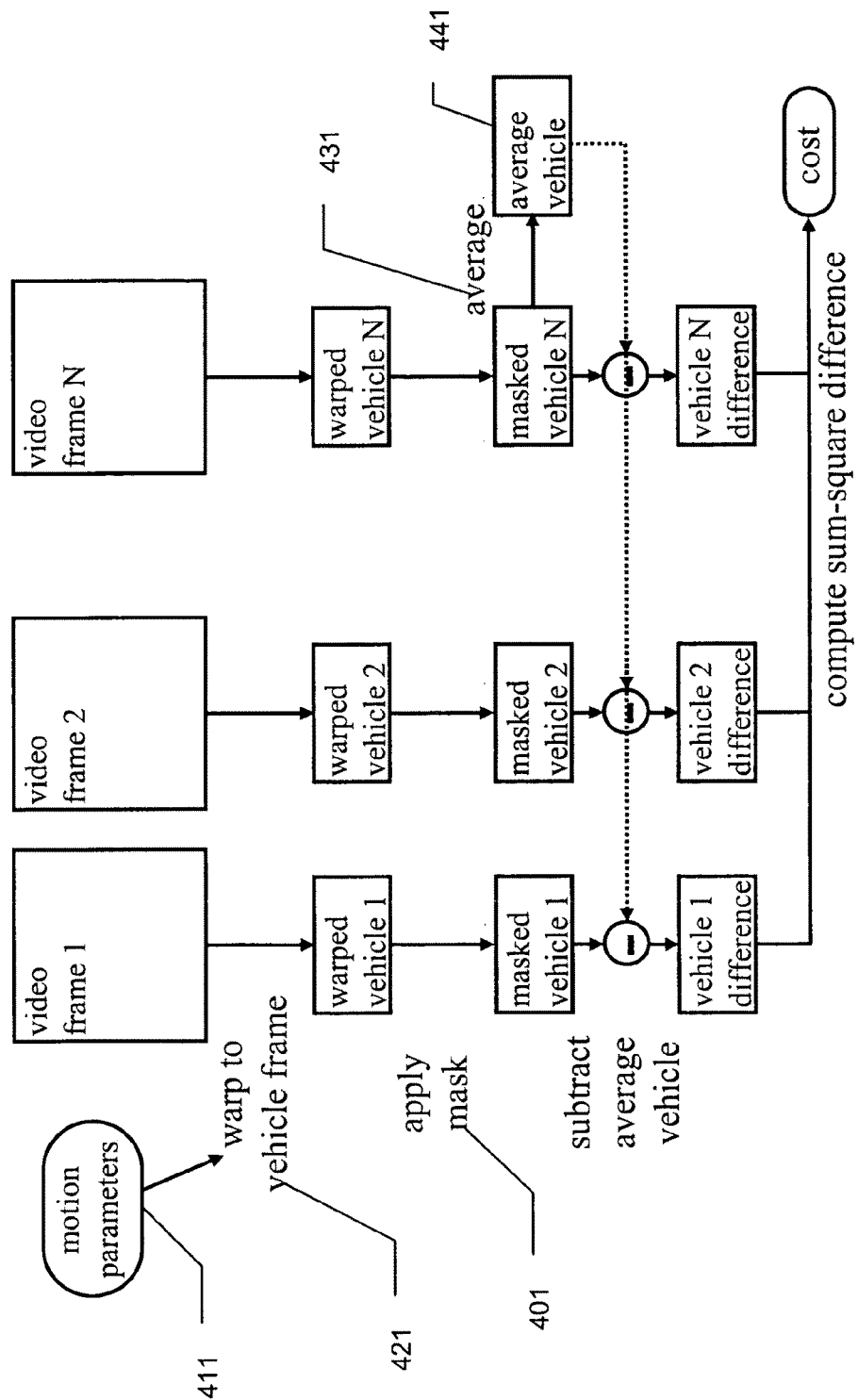
FIG. 6 is a block diagram showing an embodiment of a process for computing the vehicle portion of a cost function using vehicle motion parameters.

In an embodiment of the present invention, the above-discussed registration process is accomplished when the vehicle motion parameters are optimized by a cost function. An embodiment of a cost function, as shown in FIG. 6, begins with the application of a tapered vehicle mask 401 to the vehicle area across the image frames to smooth the function with respect to the vehicle motion parameters.

Figure 5:
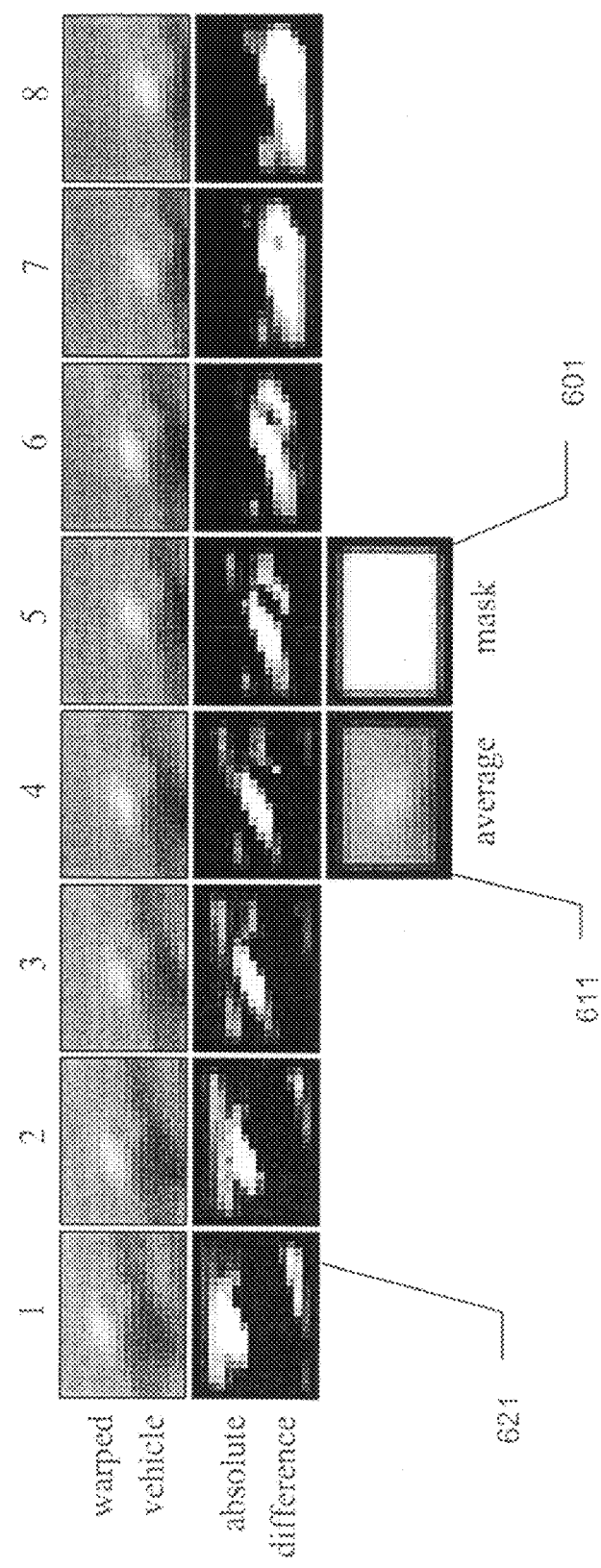
FIG. 5 shows sample warped vehicle images for a series of image frames before vehicle motion optimization.

FIG. 5 shows an embodiment of a tapered vehicle mask 601 and an average vehicle image 611 computed from the vehicle across all the image frames being registered. This embodiment of a tapered vehicle mask is a rectangular vehicle mask that has a value of 1 inside the rectangle, 0 outside the rectangle, and tapers linearly over two or three pixel widths at the mask border 601. Alternative embodiments of a tapered vehicle mask may have more or fewer pixel widths or may have non-linear or non-uniform tapers across pixel widths. The background frame of reference may also have a complementary mask defined for it that excludes the vehicle. Such a background mask is frame and time dependent since it excludes only the vehicle in each image frame. One way to define such a mask is by taking one minus the vehicle mask warped to the background frame of reference by using the vehicle position for each frame. One embodiment of such an approach may be represented by the formula: $I_{b-mask,i} = 1 - H^b_{w,b} H^{b^{-1}}_{w,i} H^V_{v,i} I_{v-mask}$, where H denotes a homography and I denotes an image. An embodiment of the results for such an approach are depicted in the "absolute difference" images 621.

The above formula warps the vehicle mask to the image frame, i, then to the world frame of reference, w, and then to the background frame of reference, b. In one embodiment of an implementation of the above formula, the three warping operations may be combined so that the mask is actually warped only once. After warping, the vehicle mask is inverted to form a tapered, complementary background mask.

In an embodiment of the present invention, as part of the computation of a cost function used to solve for vehicle motion parameters, each video frame is also warped 421, using bilinear interpolation, to the vehicle frame of reference. The warped frames are then average 431 and the previously warped vehicle mask is applied to this result. This generates an average vehicle image 441 that should match the vehicle appearance in each frame.

Figure 7:
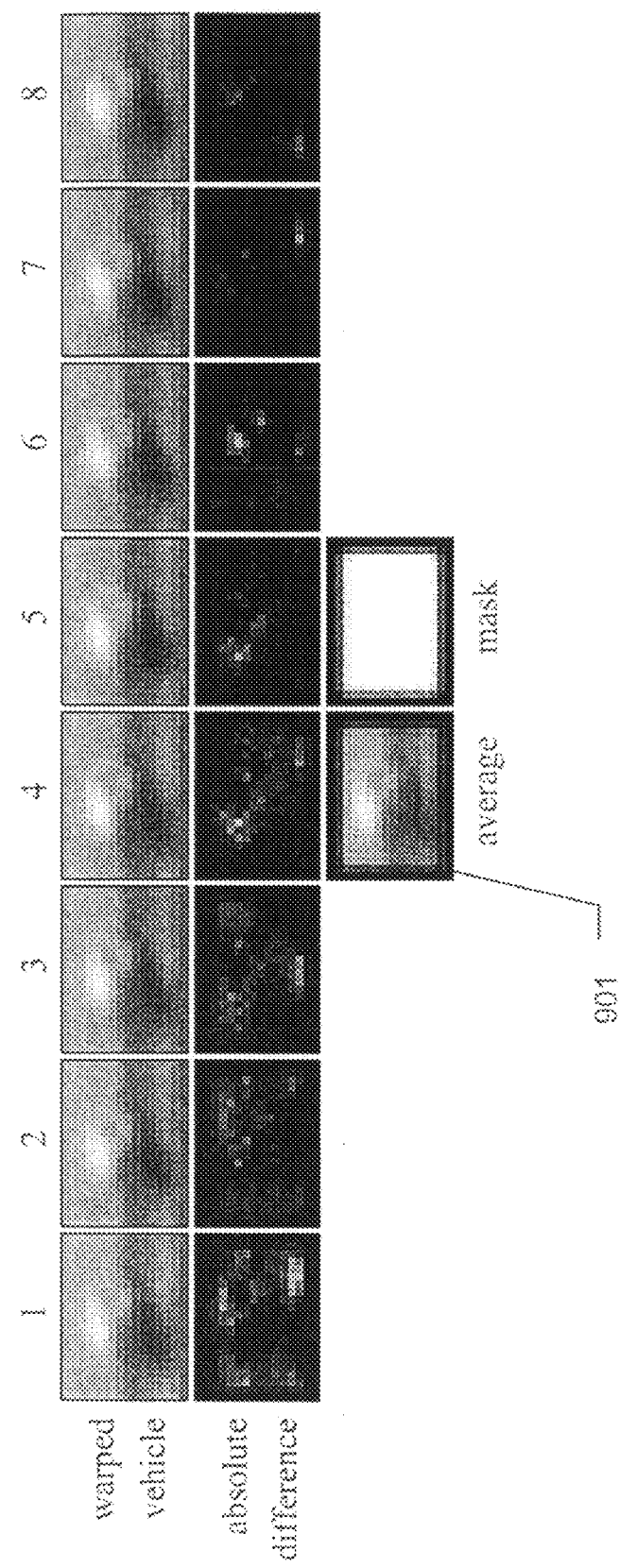
FIG. 7 shows sample warped vehicle images for a series of image frames using optimized vehicle motion parameters.

As compared to FIG. 5, which shows an average vehicle before parameter optimization 611, FIG. 7 shows an average vehicle after parameter optimization 901. Note that optimization improves the level of discernible detail in the average vehicle. Alternate embodiments of the present invention may employ different multivariate interpolation techniques, such as bicubic interpolation or Lanczos resampling. Yet further embodiments may employ techniques such as nearest-neighbor interpolation or inverse distance weighting.

An embodiment of the present invention may also warp each image frame to the background frame of reference in a fashion similar to the vehicle frame of reference warping approach, also as part of the computation of a cost function. Unlike the vehicle frame of reference, each image frame in the background frame of reference has a different background mask depending on the location of the vehicle within the image frame. After each mask is applied to the proper videoframe, the warped, masked background images are added and the background masks are also added. These two sum images are then divided to get a properly weighted average background image.

Figure 8:
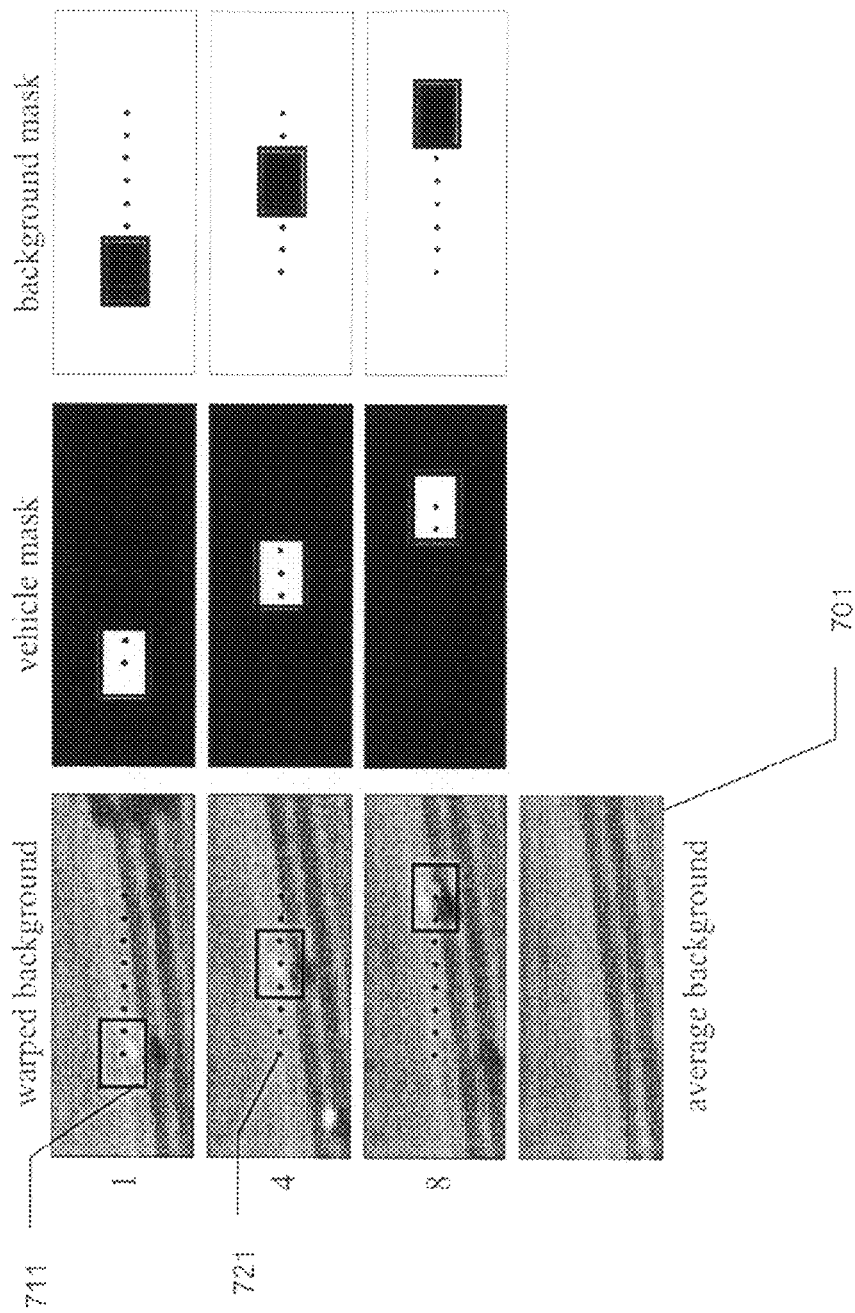
FIG. 8 shows sample warped background images for a series of image frames before vehicle motion optimization.
Figure 9:
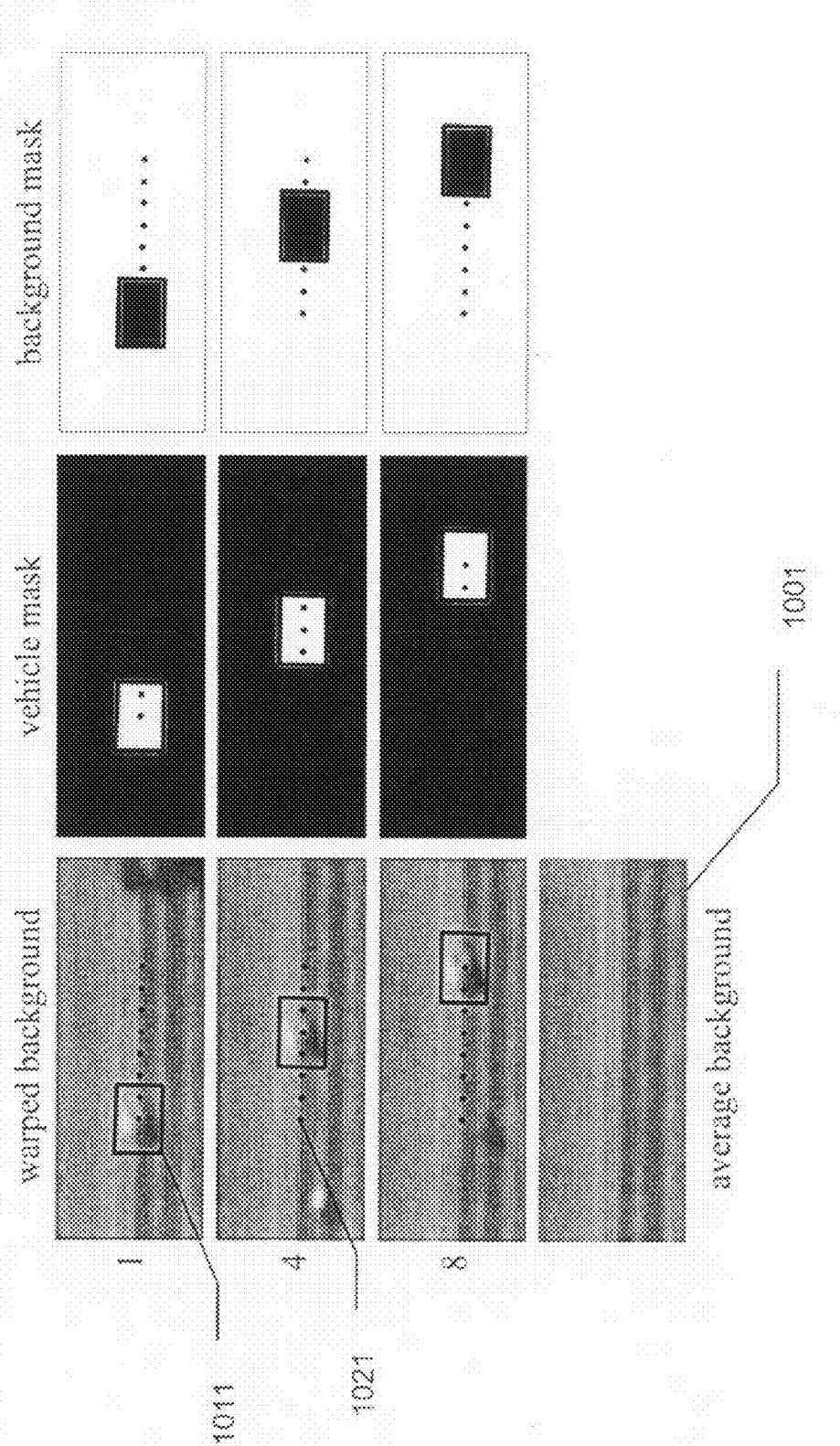
FIG. 9 shows sample warped background images for a series of image frames using optimized vehicle motion parameters.
Figure 10:
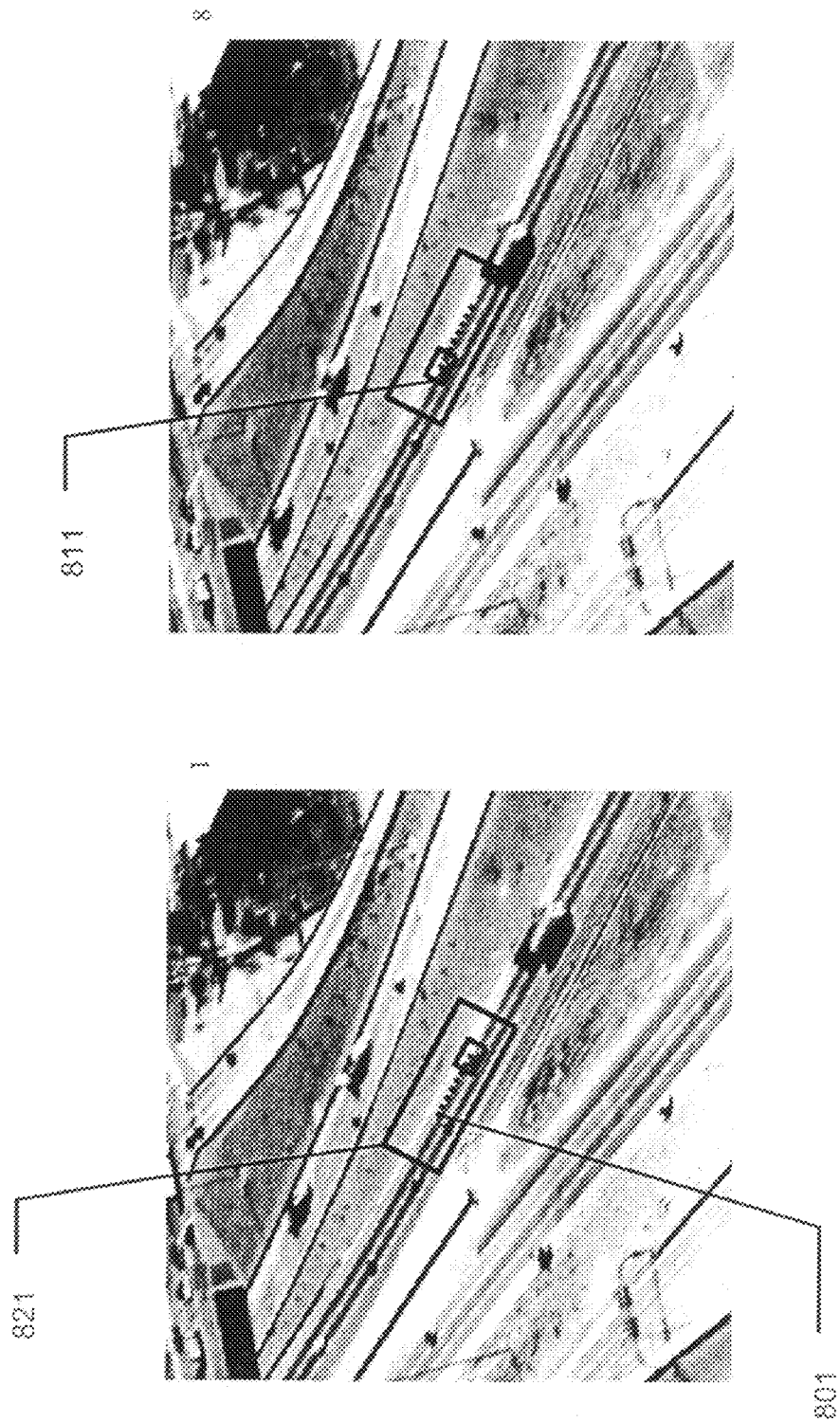
FIG. 10 shows the vehicle frame of reference and registered vehicle positions using optimized vehicle motion parameters.

FIG. 8 shows the average background before parameter optimization 701, and FIG. 9 shows the average background after parameter optimization 1001. Note that the straight-line movement assumption indicated by the waypoints 721 is not properly aligned to the actual path of vehicle movement. As a result, the actual vehicle in the image does not fully correspond to the registered area 711 identified as the vehicle across the image frames. After optimization of motion parameters, the alignment of the background in FIG. 10 is set more closely to the motion vector of the vehicle across the image frames. Here the waypoints 1021 correspond much more closely to the actual movement track of the vehicle across the image frames and the registered vehicle area 1011 follows the actual vehicle more accurately and consistently across the image frames. This motion-optimized alignment process is especially useful when a camera and a vehicle are moving in different directions or at different rates.

As shown in FIG. 10, the overall area imaged and the image contents of the image frames remain unaltered, but the motion parameter optimization aspect of the registration process allows for a much more accurate fitting of motion estimates and more precise identification and tracking of a moving object across image frames. A comparison of FIGS. 4 and 10 clearly indicates the advantages of motion parameter optimized vehicle registration. Unlike FIG. 4, the registered area of the vehicle 811, the vehicle background 821, and the vehicle waypoints 801 in FIG. 10 are all closely and accurate aligned to the actual movement of the vehicle across the image frames.

The relationship between the vehicle image in each frame and the average vehicle image is expressed in a cost function dependent upon the vehicle motion parameters. An embodiment of the present invention may employ a two-part cost function that contains a vehicle part and a background part.

The vehicle part of the cost function, an embodiment of which is depicted in FIG. 4, sums, over each frame, the image power of the masked difference between the average vehicle image and the warped vehicle image for the frame. The background part of the cost function sums, over each frame, the image power of the masked difference between the average background image and the warped background for the frame. The cost is the sum of the vehicle and background parts.

In such an embodiment, the foreground (vehicle) portion of the cost function is lower when the vehicle motion parameters align the vehicle in each frame. The effect of the background portion is to force the vehicle rectangle on top of the vehicle. Should the vehicle rectangle drift off the vehicle, portions of the vehicle are interpreted as portions of the background, thereby increasing the cost function. Alternative embodiments may use a non-rectangular vehicle mask that is more closely conformed to the shape and contours of the vehicle.

In an embodiment of the present invention, minimizing (or optimizing) the cost function is how the motion parameters are determined. In an iterative, computational embodiment of a cost function, such as one that may be created in MATLAB or C++, on the order of ten iterations may be required to register a moving vehicle across image frames in this fashion. Once the motion parameters are determined and the vehicle registered across the image frames, the images may be super-resolved.

Once the vehicle motion parameters are established, accurate frame-to-frame registration of the vehicle portion of the series of images is established. Using this registration, the vehicle may be super-resolved across the image frames. A new simple image of the vehicle with improved resolution and clarity is procuded from all of the original registered input images through processing Embodiments of a super-resolution process may be conducted in the frequency domain, the spatial domain, or both. Frequency domain super-resolution techniques such as the Frequency Domain Direct (FDD) technique are better suited for limited frame-to-frame motion of a vehicle. For more general vehicle motion, a spatial super-resolution framework, such as Robust Super-Resolution (RSR) may be preferable. In both frequency domain and spatial domain embodiments, the super-resolution technique is applied to image chips containing pixels that correspond to the registered vehicle image from each image frame.

Figure 11:
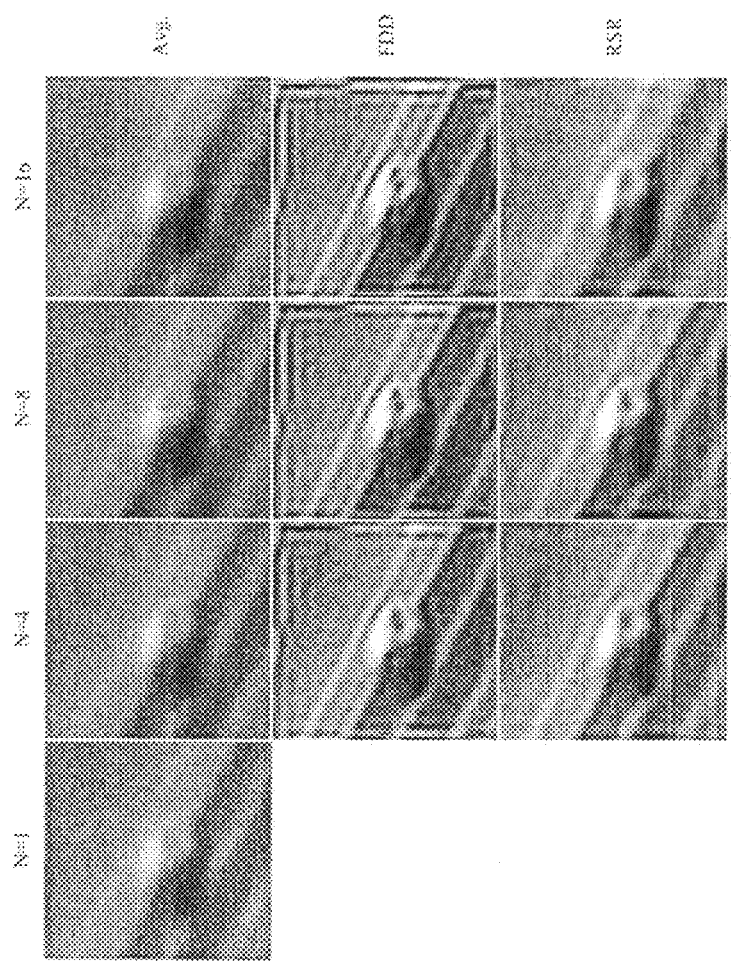
FIG. 11 shows sample super-resolved registered vehicle image results using two different image super-resolution techniques.

Using a vehicle registration and super-resolution method according to the present invention, significant additional detail may be determined from surveillance images. As shown in FIG. 11, a Frequency Domain Direct (FDD) based super resolution method according to the present invention allows for the determination of otherwise not resolvable details, such as the fact that a vehicle has a split rear window.

Although the invention has been described as a way of registering vehicles across video image frames for super-resolution, the principles and precepts of the present invention are equally applicable to super-resolving any moving object detected across multiple frames of any image data. Embodiments of the present invention may be used to super-resolve radar signatures of moving objects for improved identification, or to develop more precise thermal gradients in moving objects imaged with infra-red detectors. Further applications may include diagnostic imaging of non-stationary organs, such as hearts or lungs, and subsequent super-resolution to recover image detail otherwise undetectable with more conventional imaging techniques. Any data of a moving object expressible as a series of pixel-based image frames may be registered and super-resolved using the present invention.

Embodiments of the present invention either as programs on computer-readable media, or as programmable or function-specific hardware devices configured to perform predetermined object registration and super-resolution functions.

Figure 12:
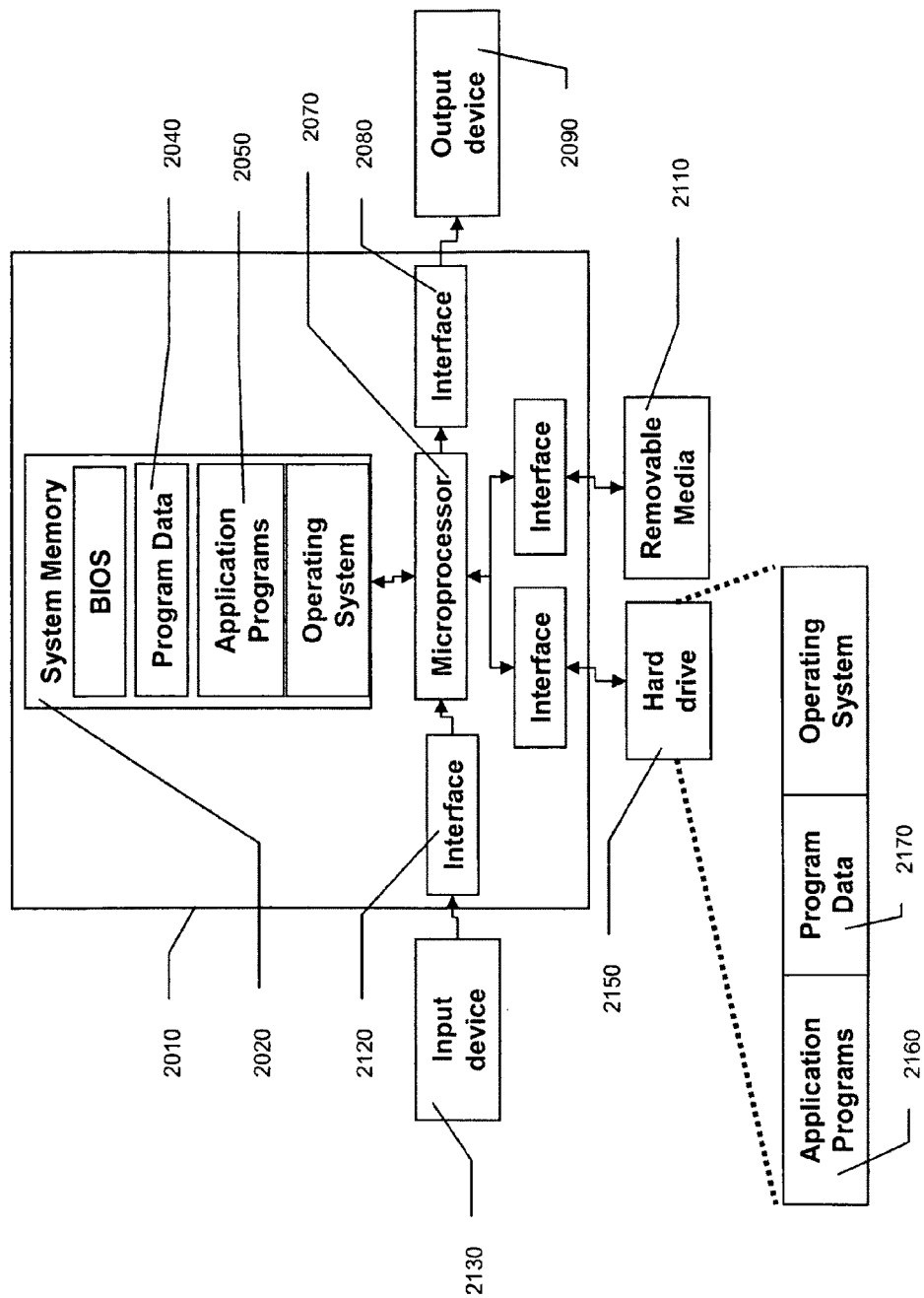
FIG. 12 shows an embodiment of a hardware device configured to execute a moving object registration method according to the present invention.

FIG. 12 depicts an embodiment of a hardware device configured to execute a moving object registration and super-resolution method according to the present invention. In this embodiment of the invention, a video camera, radar antenna, infra-red detector, or any other suitable imaging sensor may serve as an input device 2130 with an interface 2120 to image registration and super-resolution programs 2050 and their associated program data 2040, which are stored in system memory 2020 and operated on by the microprocessor 2070. The application programs 2160 and any associated program data 2170 such as operating parameters may be stored in a hard drive 2150 when not in use. Once the appropriate calculations and required processing has been performed, the system 2010 provides super-resolved image data to an output device 2090 such as a display monitor or storage database through an output interface 2080.

Alternative embodiments of the inventive system may be implemented purely in hardware, having separate microprocessors 2070 running specialized application programs 2050 for each function of the system. Yet other embodiments of the inventive system may have a hardware configuration conducive to multiple variations of registration and super-resolution according to the present invention, with the particular embodiments to be used residing on removable media 2110 or other external data sources, and only being loaded into the system prior to use. The hardware configuration may also use FPGAs, ASICs, or other methods to implement the various algorithms The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

The invention claimed is:

1. A method of registering a moving object across a set of image frames for super-resolution processing, the method comprising:
   receiving, as input, a plurality of sequential image frames, wherein each frame contains image data associated with at least one moving object;
   background registering, across all the image frames, a background region of each image frame with respect to an average background region calculated based on all the image frames;
   object registering, in each image frame, the moving object portion of the image with respect to the registered background region of each image frame, where the moving object portion of each image contains at least a portion of the image data associated with the at least one moving object;
   wherein said object registering comprises
   refining estimated motion parameters of the at least one moving object based on an object motion model, where said parameters represent said object's movement across the image frames, and
   selecting an object-specific background from the registered background where the object-specific background is an area in each image frame larger than the overall movement track covered by the moving object but smaller than the image frame, and further wherein the object-specific background has the same size, shape, and position in each image frame, relative to the average background.

2. The method of claim 1, said refining step comprising:
   applying a cost function that aligns an initial estimate of object movement across the image frames to the registered background; and
   refining the estimated motion parameters by interpolating object movement points across the image frames.

3. The method of claim 2, said applying a cost function comprising using a tapered object mask to compute an average object image based on moving object image data from each frame.

4. The method of claim 1, said background registering comprising whole-image registration of each consecutive pair of frames with a homography.

5. The method of claim 1, said registered background region of each image comprising the object-specific background.

6. The method of claim 1, wherein said moving object is a vehicle.

7. The method of claim 1, wherein said image frames are a sequence of surveillance video frames.

8. The method of claim 1, wherein said object registering further comprises warping each video frame to an object-specific frame of reference based on the estimated motion parameters.

9. The method of claim 3, wherein said applying a cost function comprises applying the object mask to the object in each image frame and wherein the cost calculated by the cost function comprises a sum-square difference computed based on the differences in each frame between the masked object and the average object.

10. The method of claim 1, further comprising super-resolving the registered moving object portion of the image data across all image frames.

11. A non-transitory computer-readable medium having embodied thereon a program that, when executed, causes a computing device to execute a method of registering a moving object across a set of image frames for super-resolution processing, the method comprising:
   receiving, as input, a plurality of sequential image frames, wherein each frame contains image data associated with at least one moving object;
   background registering, across all the image frames, a background region of each image frame with respect to an average background region calculated based on all the image frames;
   object registering, in each image frame, the moving object portion of the image with respect to the registered background region of each image frame, where the moving object portion of each image contains at least a portion of the image data associated with the at least one moving object; and
   wherein said object registering comprises refining estimated motion parameters of the at least one moving object based on an object motion model, where said parameters represent said object's movement across the image frames.

12. An apparatus for registering a moving object across a set of image frames for super-resolution processing, the device comprising:
   an imaging sensor that captures image data of a scene containing at least one moving object, said image data represented by a plurality of sequential of image frames;

a background calculator that calculates an average background region based on the image frames, a background registration unit that registers, across the image frames, a background region of each image frame with respect to the average background region;

an object registration unit that registers, in each image frame, the moving object portion of the image with respect to the registered background region of each image frame, wherein the moving object portion of each image contains at least a portion of the image data associated with the at least one moving object, and further wherein the object registration unit comprises an object motion modeling sub-unit that refines estimated motion parameters of the at least one moving object based on an object motion model, where the parameters represent the object's movement across the image frames.

13. The apparatus of claim 12, the object motion modeling sub-unit comprising a cost function engine that aligns an initial estimate of object movement across the image frames to the registered background; and an interpolation engine that refines the estimated motion parameters by interpolating object movement points across the image frames.

* * * * *